United States Patent [19]

Chen et al.

[11] Patent Number: 4,803,702
[45] Date of Patent: Feb. 7, 1989

[54] RESET AND SYNCHRONIZATION INTERFACE CIRCUIT

[75] Inventors: Shallop J. Chen, Milpitas, Calif.; Jan Johansson, Balsta, Sweden

[73] Assignee: Advanced Micro Devices, Inc., Sunnyvale, Calif.

[21] Appl. No.: 893,432

[22] Filed: Aug. 5, 1986

[51] Int. Cl.$^4$ .............................................. H04L 7/00
[52] U.S. Cl. ..................................... 375/106; 370/100
[58] Field of Search ................ 375/106; 307/362, 363; 328/74, 115; 340/870.14, 825.14; 370/100

[56] References Cited

U.S. PATENT DOCUMENTS 3,798,555  3/1974  Tempka et al. ........................ 328/74
4,503,490  3/1985  Thompson ........................... 375/106
4,549,100  10/1985 Spence ................................ 307/368

Primary Examiner—Benedict V. Safourek
Attorney, Agent, or Firm—Davis Chin

[57] ABSTRACT

A reset and synchronization interface circuit for use in a subscriber power controller includes a reset circuit portion and a synchronization circuit portion. The reset circuit portion is formed of a first comparator, a second comparator, and an output network for generating a reset signal. The first comparator compares an input signal with the reference voltage to produce a first output signal and a second output signal. The second comparator compares the first output signal from the first comparator with the reference voltage to produce a third output signal. The output network inverts and shifts the level of the third output signal to produce the reset signal. The synchronization circuit portion is formed of a third comparator and an AND logic gate for generating a modified synchronizing signal. The third comparator inverts a synchronizing clock signal to generate a complementary synchronizing clock signal. The AND logic gate combines logically the second output signal from the first comparator with the complementary synchronizing clock signal to produce the modified synchronizing signal.

17 Claims, 3 Drawing Sheets

RESET AND SYNCHRONIZATION INTERFACE CIRCUIT

BACKGROUND OF THE INVENTION

This invention relates generally to interface circuits for use in telecommunication systems and more particularly, it relates to a reset and synchronization interface circuit for use in a subscriber power controller integrated circuit which supplies power across the S interface of the Integrated Services Digital Network (ISDN).

In the field of telecommunications, use of digital signalling techniques in transmitting information over long distances is gaining more and more prominence for a wide range of communication, including voice, computer data and video data. Typically, the S or subscriber lines interface as referred to by the Consultative Committee for international Telegraphy and Telephony (CCITT) is used to interconnect ISDN terminal equipment to one or more network terminators such as a private branch exchange (PBX). A subscriber power controller (SPC) is used to convert the 40 volts delivered at the S interface into a stable, regulated 5 volt power supply for integrated circuits in the ISDN terminal equipment such as a phone or data generating equipment. Such a power controller is manufactured and sold by Advanced Micro Devices, Inc. of Sunnyvale, Calif. under part No. designated as Am7936. The subscriber power controller is an integrated circuit formed in a single-chip package and has as one of its capabilities to reset a digital subscriber controller, a microprocessor, and other integrated circuits in the terminal equipment upon detecting of a low voltage and to synchronize an internal free-running oscillator to be in synchronism with an external clock signal for use with other integrated circuits in the terminal equipment.

A reset and synchronization interface circuit of the present invention is provided as a part of the same subscriber power controller integrated circuit for performing such resetting and synchronizing functions so as to provide reset signals to other integrated circuits in the terminal equipment and to eliminate noise interference due to intermodulation hum. This result is achieved by the provision of a resetting means formed of a first comparator, a second comparator and an inverting network for generating a reset signal and a synchronizing means formed of a third comparator and a logic gate for generating a modified synchronizing signal.

SUMMARY OF THE INVENTION

In the preferred embodiment of the present invention, the reset and synchronization interface circuit for use in a subscriber power controller includes resetting means for generating a reset signal and synchronizing means for generating a modified synchronizing signal. The resetting means is formed of first comparator means, second comparator means, and network means. The synchronizing means is formed of a third comparator means and an AND logic gate. The first comparator means is formed of a first comparator with hysteresis for comparing an input signal with a reference signal to produce a first output signal and a second output signal. The second comparator means is formed of a second comparator for comparing the first output signal from the first comparator with the reference voltage to produce a third output signal. The network means is responsive to the third signal for converting and shifting the level of the third output signal to produce the reset signal.

The third comparator means is formed of a third comparator for inverting of a synchronizing pulse to generate a complementary synchronizing pulse. The AND logic gate combines logically the second output signal from the first comparator with the complementary synchronizing pulse to produce the modified synchronizing signal.

BRIEF DESCRIPTION OF THE DRAWINGS

The present invention will become better understood from the following detailed description when read in conjunction with the accompanying drawings with like reference numerals indicating corresponding parts throughout, wherein.

DESCRIPTION OF THE PREFERRED EMBODIMENT

Figure 1:
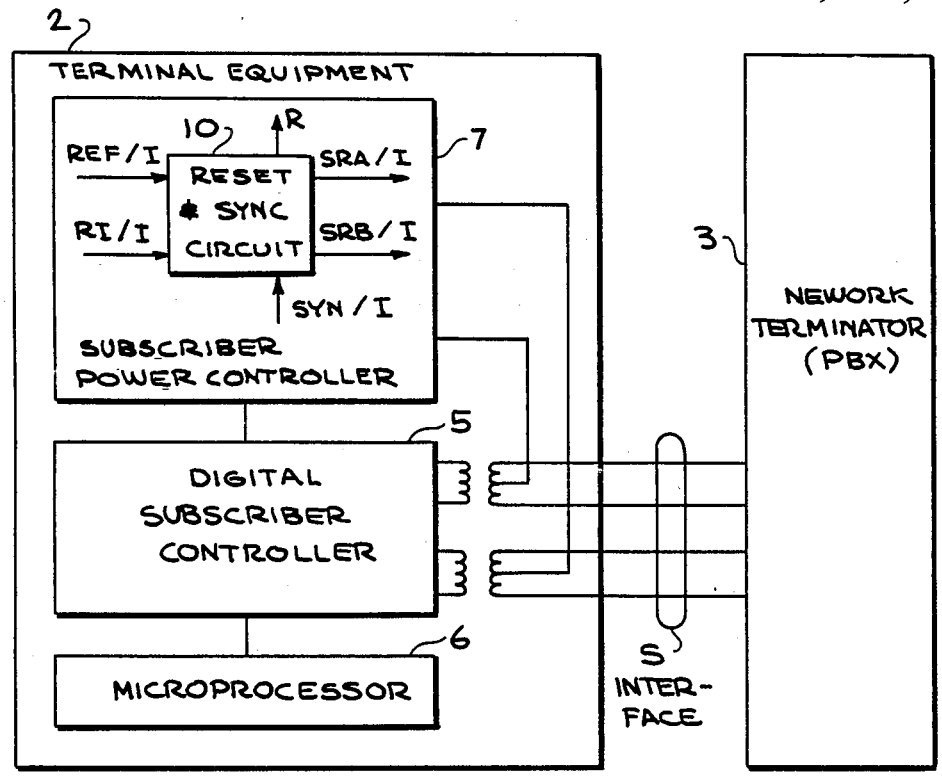
FIG. 1 is an overall block diagram of an integrated services digital network for communication across the S interface in accordance with the present invention.

Referring now in detail to the drawings, there is shown in FIG. 1 an overall block diagram of an integrated services digital network (ISDN) for communication across the S or subscriber interface which connects terminal equipment 2 to a network terminator 3 such as a private branch exchange (PBX). The terminal equipment 2 includes a digital subscriber controller 5, a microprocessor 6 and a subscriber power controller 7. As previously explained, the subscriber power controller is an integrated circuit which converts the 40 volts delivered at the S interface into a stable, regulated 5 volt power supply for the other chips in the ISDN terminal equipment. As part of the same subscriber power controller integrated circuit or chip 7, there is provided a reset and synchronization circuit 10 which functions to reset the digital subscriber controller 5, the microprocessor 6 and other integrated circuits in the terminal equipment 2 upon detecting of a low supply voltage and to synchronize an internal free-running oscillator to be in synchronism with an external clock signal for use with other integrated circuits in the terminal equipment.

Figure 2:
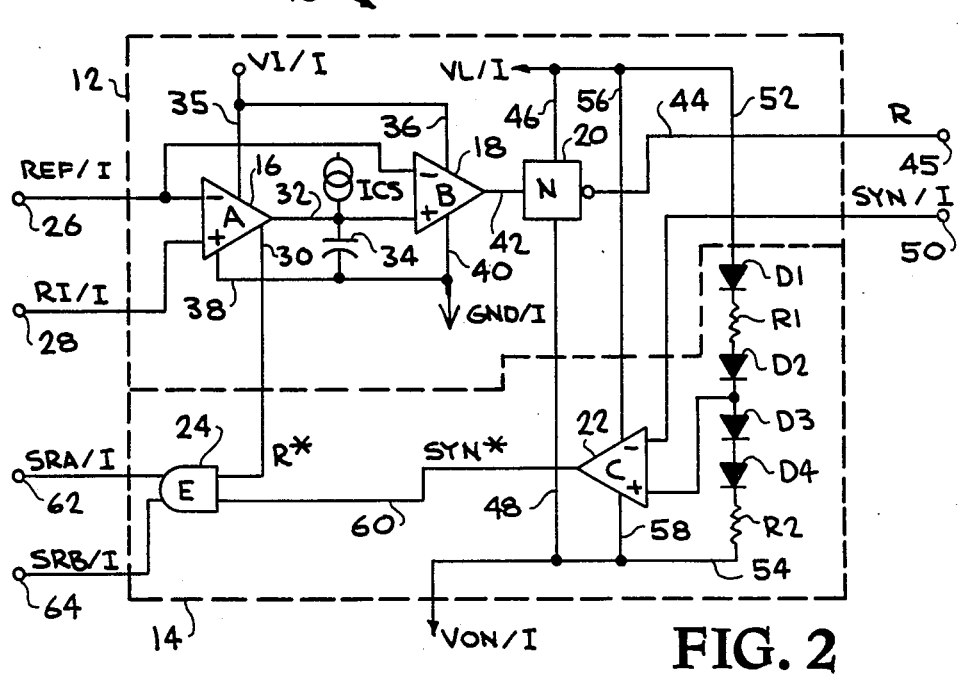
FIG. 2 is a block diagram of a reset and synchronization interface circuit of the present invention for use in the subscriber power controller block of FIG. 1.

A more detailed block diagram of the reset and synchronization interface circuit 10 of the present invention is illustrated in FIG. 2. Interface circuit 10 is formed of a reset circuit portion 12 and a synchronization circuit portion 14. The reset circuit portion 12 includes a first comparator 16, a second comparator 18, and an output network 20. The synchronization circuit portion 14 includes a third comparator 22 and an AND logic gate 24.

The first comparator 16 has its inverting input connected to an input terminal 26 for receiving a reference signal REF/I which is typically at 2.5 volts d.c. The non-inverting input of the first comparator 16 is connected to an input terminal 28 for receiving an input signal RI/I derived from a DAMP block (not shown) in the subscriber power controller. The comparator 16 has a first output signal R* on line 30 connected to one input of the AND logic gate 24 in the sychronization circuit portion 14. A second output signal of the comparator 16 on line 32 is connected to the non-inverting input of the second comparator 18 and to one end of a capacitor 34. The inverting input of the comparator 18 is also connected to the reference signal REF/I. A low power supply VI/I which is typically 5.08 volts is applied to the comparators 16 and 18 via lines 35 and 36. A ground potential GND/I is connected to the comparators 16 and 18 via lines 38 and 40. The second end of the capacitor 34 is also connected to the ground potential GND/I. The output of the comparator 18 on line 42 is fed to the input of the output network 20. The output of the network 20 on line 44 provides a reset signal R consisting of a positive pulse for resetting the digital subscriber controller 5, microprocessor 6 and other integrated circuits in the terminal equipment 2. A positive supply voltage VL/I and a negative supply voltage VON/I are connected to the network 20 by means of lines 46 and 48, respectively.

The third comparator 22 has its inverting input connected to an input terminal 50 for receiving a synchronizing clock signal operating typically at a frequency of 192 kHz. The non-inverting input of the comparator 22 is connected via a diode D2, a resistor R1, a diode D1 and line 52 to the positive supply voltage VL/I and via a diode D3, a diode D4, a resistor R2 and line 54 to the negative supply voltage VON/I. The positive and negative supply voltages are also connected to the comparator 22 via the respective lines 56 and 58. The output signal SYN* from the comparator 22 on line 60 is a complement of the synchronizing signal SYN/I, and is fed to a second input of the logic gate 24. As previously stated, the first input to the logic gate 24 is the signal R*. This signal R* is a complement of the reset signal R at the output terminal 45. The modified synchronizing output signals SRA/I and SRB/I at respective output terminals 62 and 64 from the logic gate 24 operate in accordance with the truth table and Boolean logic expression shown below.

| R* | SYN* | SRA/I or SRB/I |
|---|---|---|
| 0 | 1 | 0 |
| 0 | 0 | 0 |
| 1 | 0 | 0 |
| 1 | 1 | 1 |

SRA/I = R* . SYN*

Figure 3A:
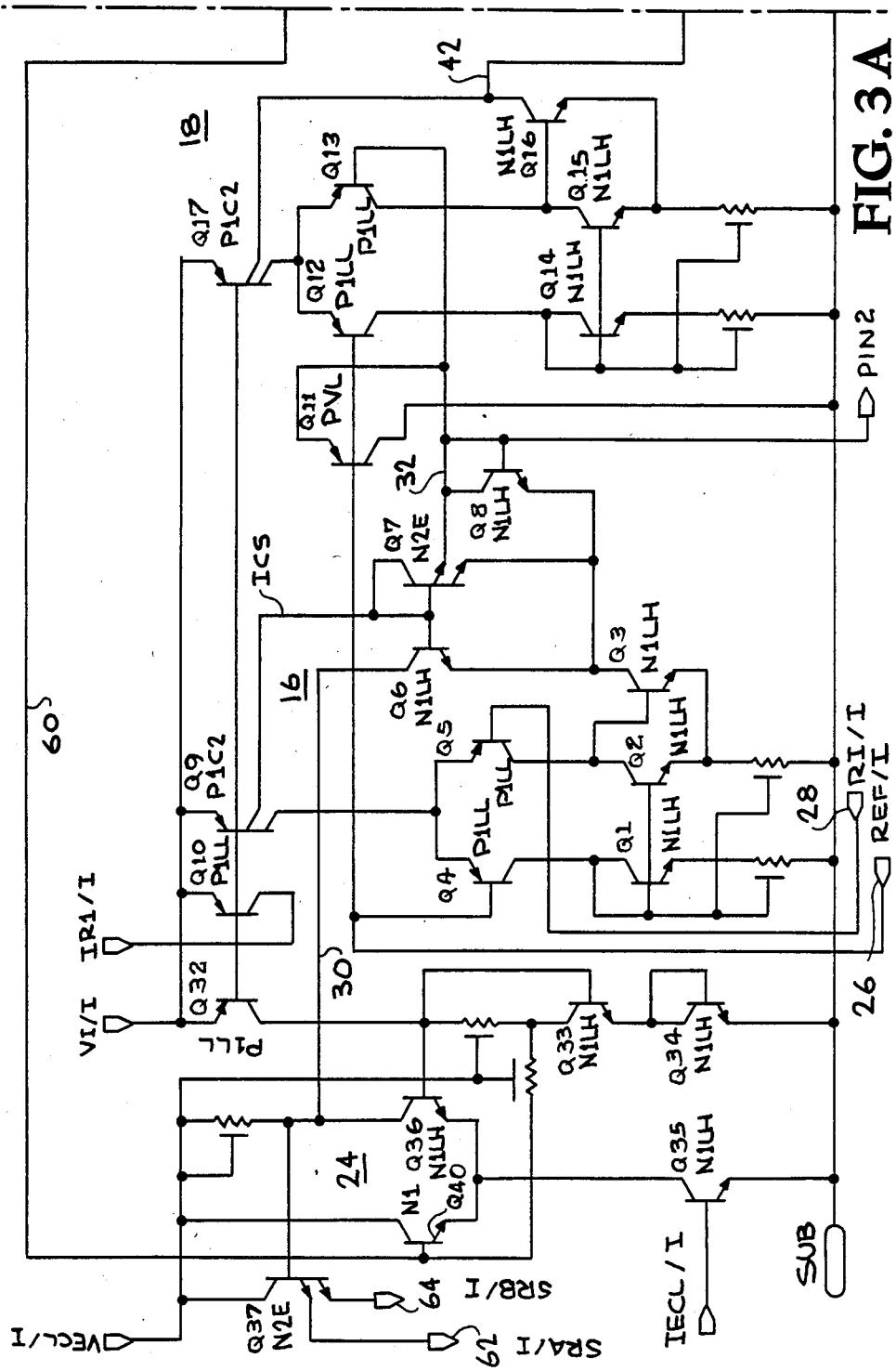
FIGS. 3A and 3B, when connected together, is a detailed schematic circuit diagram of the various blocks of FIG. 2.
Figure 3B:
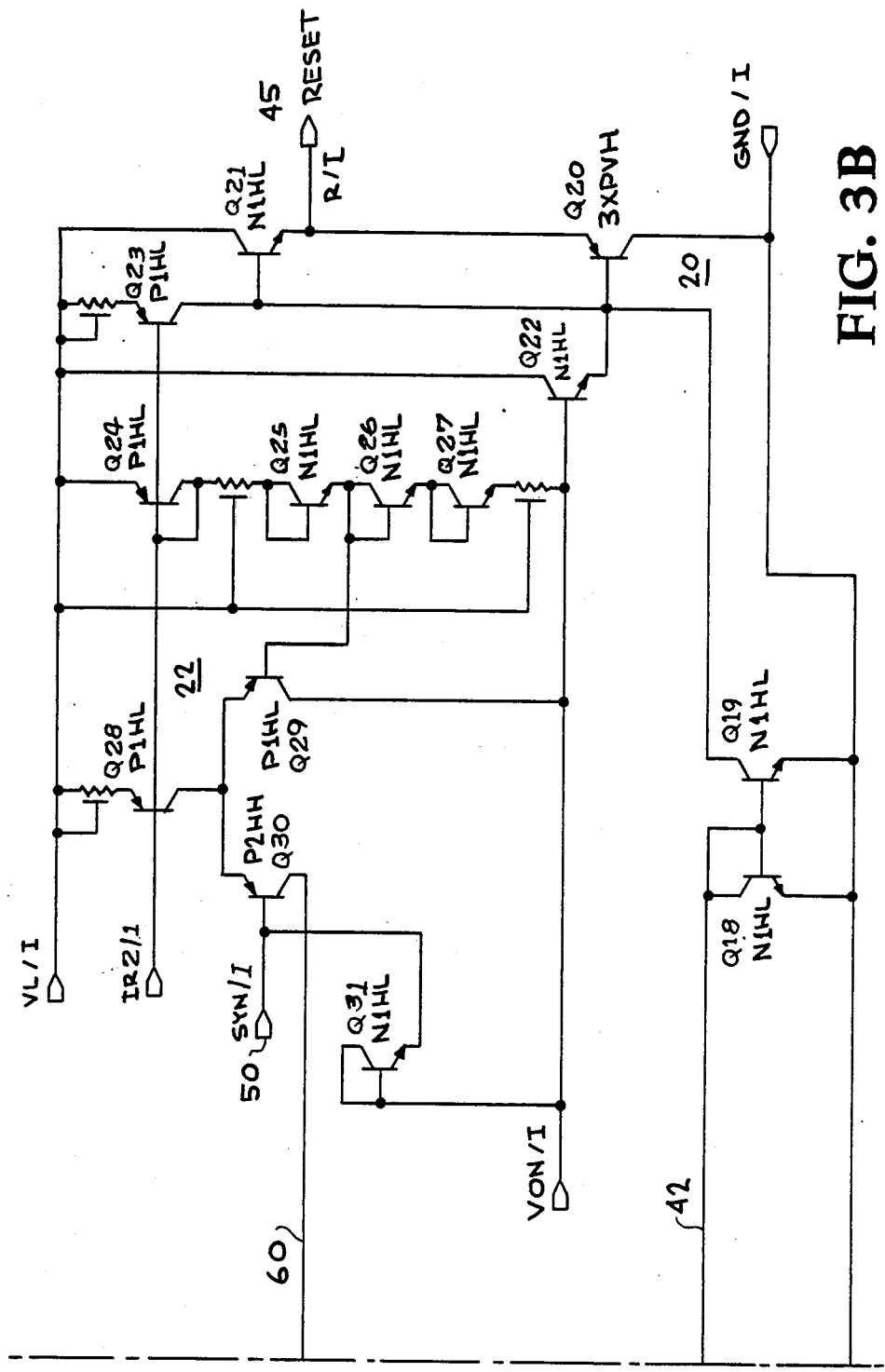

A detailed schematic circuit diagram of the comparators 16, 18, and 22, output network 20, and logic gate 24 in the reset and synchronization interface circuit 10 is shown in FIGS. 3A and 3B of the drawings. As can be seen, in the reset circuit portion 12 the first comparator 16 includes a transistor Q9 to provide a base current, a differential amplifier formed of a pair of transistors Q4 and Q5, a resistor-biased current mirror formed of transistors Q1 and Q2 serving as an active load, a transistor Q3 and a current mirror formed of transistors Q6 and Q7. The reference signal REF/I on the input terminal 26 is applied to the base of the transistor Q4, and the input signal RI/I on the input terminal 28 is applied to the base of the transistor Q5. The first output of the comparator 16 is at the emitter of the transistor Q7 which is connected to the collector of transistor Q8. The second output of the comparator 16 is at the collector of the transistor Q6.

Normally, the input signal RI/I will be higher than the reference signal REF/I. This causes the transistors Q5, Q2 and Q3 to be turned off. Thus, the first output at the emitter of the transistor Q7 will be high. Consequently, the external capacitor 34 connectable to pin 2 will be permitted to charge up from the current source ICS. The capacitor 34 will determine the duration of the reset pulse. Further, the output at the collector of the transistor Q6 will also be high so as to enable the logic gate 24. On the other hand, when the input signal RI/I is lower than the reference voltage REF/I, the transistors Q5, Q2 and Q3 will be rendered conductive so that the output at the emitter of the transistor Q7 will be low. Accordingly, the capacitor 34 will be allowed to be discharged. Further, the output at the collector of the transistor Q6 will also be low so as to disable the AND logic gate 24.

The second comparator 18 is of a similar construction to that of the comparator 16 and comprises a transistor Q17 to provide a bias current, a differential amplifier formed of a pair of transistors Q12 and Q13, a resistor-biased current mirror formed of transistors Q14 and Q15 serving as an active load, and a transistor Q16. The reference signal REF/I is applied to the base of the transistor Q12, and the first output of the comparator 16 is applied to the base of the transistor Q13. The output of the comparator 18 is taken at the collector of the transistor Q16. The non-inverting input of the comparator 18 corresponding to the base of the transistor Q13 will normally be charged up to a voltage higher than the reference voltage REF/I. Thus, the output of the comparator 18 will normally be at a high voltage level. When the capacitor 34 connected to non-inverted input of the comparator 18 is discharged, the output will be changed to a low voltage level.

The output network 20 functions to invert and shift the level of the output of the comparator 18. The network 20 includes a current source transistor Q23, a current mirror formed of transistors Q18 and Q19, and a class-B push-pull output stage formed of transistors Q22, Q21 and Q20. Normally, with the output of the comparator 18 being at a high voltage level the transistor Q19 will be rendered conductive so as to cause sinking of the current through the transistor Q20. Thus, the reset signal R at the junction of the emitters of the transistors Q21 and Q20 will be at a low voltage level When the output of the comparator 18 is changed to a low voltage level, the transistor Q19 will be turned off and a sourcing of the current will be through the transistor Q21. Therefore, the output of the network 20 will be switched to a high voltage level corresponding to a positive pulse which is the reset signal R for resetting the digital subscriber controller 5, microprocessor 6 and the other integrated circuits in the terminal equipment 2.

In the synchronization circuit portion 14, the comparator 22 includes a transistor Q28 to provide a bias current, a differential amplifier formed of a pair of transistors Q29 and Q30, and a biasing string formed of diode-connected transistors Q24 through Q27 and resistors R1 and R2. The transistors Q24–Q27 correspond to the respective diodes D1 through D4 of FIG. 2. The non-inverting input of the comparator 22 corresponds to the base of the transistor Q29 and is connected to the junction of the diode-connected transistors Q25 and Q26 of the biasing string. The inverting input corresponds to the base of the transistor Q30 which is connected to the input terminal 50 for receiving the synchronizing clock signal SYN/I. The output of the comparator 22 is at the collector of the transistor Q30 which is connected to the second input of the AND logic gate 24 via line 60. The AND logic gate 24 comprises an ECL gate circuit formed of a differential amplifier having a pair of transistors Q40 and Q36, a current source transistor Q35 and an emitter follower transistor Q37. The complement of the reset signal R is applied to the base of the emitter follower transistor Q37, and the complement of the synchronizing signal SYN/I is applied to the base of the transistor Q40. The modified synchronizing signal SRA/I is from a first emitter of the emitter follower transistor Q37, and the modified synchronizing signal SRB/I is from a second emitter of the transistor Q37.

When the input signal RI/I to the comparator 16 is higher than the reference voltage REF/I during the normal operating conditions, the transistor Q6 in the comparator 16 will be turned off and thus, the complementary reset signal R* will be at a high voltage level. Therefore, the modified synchronizing output signals SRA/I and SRB/I will be controlled by the complement of the synchronizing signal SYN/I. However, if the input signal RI/I to the comparator 16 is lower than the reference voltage REF/I representing a detection of a low supply voltage, the transistor Q6 will be turned on so as to cause the complementary synchronizing signal R* to be at a low voltage level, thereby maintaining the outputs of the logic gate 24 to be in a low condition regardless of the complementary synchronizing signal SYN*. In other words, the AND logic gate will be disabled so as to prevent the synchronizing signal SYN/I from reaching the output terminals 62 and 64.

From the foregoing detailed description, it can thus be seen that the present invention provides a reset and synchronization interface circuit for use in a subscriber power controller which includes resetting means for generating a reset signal and a synchronizing means for generating a modified synchronizing signal. The reset signal is a positive pulse which is generated when an input signal is lower than a reference voltage. At the same time, the modified synchronizing signal will become disabled. Further, there is provided a method for generating a reset signal and a synchronized signal for use in a subscriber power controller device so as to provide reset signals to other integrated circuits in the terminal equipment and to eliminate noise interference due to intermodulation hum.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A rest and circuit synchronization interface circuit for use in a subscriber power controller comprising:
resetting means including first comparator means, second comparator means, and network means generating a reset signal at a first node;
said first comparator means being formed of first comparator having hysteresis for comparing an input signal with a reference voltage to produce a first output signal;
said second comparator means being formed of a second comparator for comparing the first output signal from the first comparator with the reference voltage to produce a second output signal;
said network means being responsive to the second signal for inverting and shifting the level of the second output signal to produce the reset signal;
synchronizing means including a third comparator means and an AND logic gate for generating a modified synchronizing signal at a second node;
said third comparator means being formed of a third comparator for inverting of a synchronizing clock signal to generate a complementary synchronizing clock signal; and
said logic gate combining logically the first output signal from said first comparator with the complementary synchronizing clock signal to produce the modified synchronizing signal.

2. A reset and synchronization interface circuit as claimed in claim 1 wherein said first comparator comprises a first differential amplifier formed of a pair of transistors whose bases are connected to the input signal and the reference voltage.

3. A reset and synchronization interface circuit as claimed in claim 2, wherein said second comparator comprises a second differential amplifier formed of a pair of transistors whose bases are connected to the output of said first comparator and the reference voltage.

4. A reset and synchronization interface circuit as claimed in claim 3, wherein said network means comprises a current mirror arrangement and a push-pull output stage.

5. A reset and synchronization interface circuit as claimed in claim 4, wherein said third comparator comprises a third differential amplifier formed of a pair of transistors whose bases are connected to the synchronizing clock signal and a bias voltage.

6. A reset and synchronization interface circuit as claimed in claim 5, wherein said AND logic gate comprise an ECL circuit formed of an input transistor, a reference transistor, and a current source.

7. A reset and synchronization interface circuit as claimed in claim 1, wherein said reset signal is normally a low voltage level and is changed to a high voltage level corresponding to a positive pulse in response to the input signal being lower than the reference voltage.

8. A reset and synchronization interface circuit as claimed in claim 7, wherein said first output signal from said first comparator is a complement of the reset signal which is used to disable the AND logic gate when there is a low voltage detected so as to prevent the synchronizing clock signal from reaching the second output node.

9. In a subscriber power controller device for converting a high voltage at an S interface into a stable, regulated low voltage to be used by integrated circuits in an ISDN terminal equipment, said controller device including resetting and synchronization means for resetting a digital subscriber controller, a microprocessor and other integrated circuits in the terminal equipment and for synchronizing an internal free-running oscillator to be in synchronism with an external clock signal in the other integrated circuits, said resetting and synchronizing means comprising:

resetting means including first comparator means, second comparator means, and network means generating a reset signal at a first node;

said first comparator means being formed of first comparator having hysteresis for comparing an input signal with a reference voltage to produce a first output signal;

said second comparator means being formed of a second comparator for comparing the first output signal from the first comparator with the reference voltage to produce a second output signal;

said network means being responsive to the second signal for inverting and shifting the level of the second output signal to produce the reset signal;

synchronizing means including a third comparator means and an AND logic gate for generating a modified synchronizing signal at a second node;

said third comparator means being formed of a third comparator for inverting of a synchronizing clock signal to generate a complementary synchronizing clock signal; and said logic gate combining logically the first output signal from said first comparator with the complementary synchronizing clock signal to produce the modified synchronizing signal.

10. In a reset and synchronization interface circuit as claimed in claim 9 where in said first comparator comprises a first differential amplifier formed of a pair of transistors whose bases are connected to the input signal and the reference voltage.

11. In a reset and synchronization interface circuit as claimed in claim 10, wherein said second comparator comprises a second differential amplifier formed of a pair of transistors whose bases are connected to the output of said first comparator and the reference voltage.

12. In a reset and synchronization interface circuit as claimed in claim 11, wherein said network means comprises a current mirror arrangement and a push-pull output stage.

13. In a reset and synchronization interface circuit as claimed in claim 12, wherein said third comparator comprises a third differential amplifier formed of a pair of transistors whose bases are connected to the synchronizing clock signal and a bias voltage.

14. In a reset and synchronization interface circuit as claimed in claim 13, wherein said AND logic gate comprise an ECL circuit formed of an input transistor, a reference transistor, and a current source.

15. In a reset and synchronization interface circuit as claimed in claim 9, wherein said reset signal is normally a low voltage level and is changed to a high voltage level corresponding to a positive pulse in response to the input signal being lower than the reference voltage.

16. In a reset and synchronization interface circuit as claimed in claim 15, wherein said first output signal from said first comparator is a complement of the reset signal which is used to disable the AND logic gate when there is a low voltage detected so as to prevent the synchronizing clock signal from reaching the second output node.

17. A method for generating a reset signal and a synchronization signal for use in a subscriber power controller device, said method comprising of the steps of:

comparing an input voltage with a reference voltage to produce a first signal;

comparing the first signal with the reference voltage to produce a second signal;

inverting and shifting the level of the second signal to produce a reset signal;

inverting a synchronizing clock signal to produce a complementary synchronizing clock signal; and combining logically the first signal and the complementary synchronizing clock signal to produce a modified synchronizing signal only when the first signal corresponding to a complement of the rest signal is at a high voltage level.

* * * * *